United States Patent [19]
Christiansen et al.

[11] Patent Number: 5,748,485
[45] Date of Patent: May 5, 1998

[54] SOFTWARE VENDING MACHINE HAVING CD-ROM STORAGE

[75] Inventors: Lars K. Christiansen, Bluffdale; Mark H. Roberts, Midvale; David J. Griffiths, Spanish Fork; Brent R. Adamson, Wendover, all of Utah

[73] Assignee: LaserVend, Inc., Orem, Utah

[21] Appl. No.: 420,122

[22] Filed: Apr. 11, 1995

[51] Int. Cl.$^6$ ................................................. G06F 17/00
[52] U.S. Cl. ................ 364/479.04; 395/216; 364/479.06
[58] Field of Search ........................... 364/401, 478, 364/479, 410, 479.01–479.08, 479.1–479.14; 235/381; 369/84; 360/15, 60; 380/4, 22; 395/221, 218

[56] References Cited

U.S. PATENT DOCUMENTS

| | | | |
|---|---|---|---|
| 4,949,257 | 8/1990 | Orbach | 364/401 |
| 4,959,861 | 9/1990 | Howlette | 380/4 |
| 5,162,989 | 11/1992 | Matsuda | 364/401 |
| 5,303,844 | 4/1994 | Muehlberger | 235/381 |
| 5,513,116 | 4/1996 | Buckley et al. | 364/479 |
| 5,518,325 | 5/1996 | Kahle | 369/84 |

*Primary Examiner*—Reba I. Elmore
*Assistant Examiner*—Steven R. Garland
*Attorney, Agent, or Firm*—Mallinckrodt & Mallinckrodt

[57] ABSTRACT

A vending machine for vending computer software comprises, a bill acceptor for receiving money, an optical disk for storing a selection of programs to be vended, a hard disk drive for storing operating software, accounting information, and updates to the software vended, a diskette dispenser, and a disk drive all under control of a processor. The invention further comprises a device for indicating a program selection to the processor such that the processor may direct the writing of a customer-selected program to a diskette after money has been received.

23 Claims, 4 Drawing Sheets

5,748,485

SOFTWARE VENDING MACHINE HAVING CD-ROM STORAGE

BACKGROUND OF THE INVENTION

1. Field of the Invention

The invention relates to the field of software vending machines. More particularly, the present invention relates to software vending machines comprising a computer, a storage device for software programs, apparatus for collecting money or billing a charge account, a device for selecting which of several software programs are to be vended, and a device for duplicating programs onto a removable storage media that is compatible with a customer's computer system.

2. State of the Art

In modern times, there has been an explosion of available software, especially that subset of software known as shareware. Literally thousands of programs are available. Some of these programs sell much more frequently than do others. A conventional vending machine, such as those commonly used for candy, has a fixed capacity, and typically can hold only one or two dozen each of a fixed number of products. Conventional vending machines capable of handling more than 100 different products are bulky and rare. If used for selling software, a conventional vending machine offers a small selection of programs with a high likelihood that a particularly "hot" selling program may run out of stock.

Specialized software vending machines allow any of a large number of programs to be dispensed at a buyer's request onto blank, or preformatted, media that may be stocked in bulk within the machine. These machines eliminate the risk of "hot" product sellouts while slow selling product is still stocked in the machine because the identifying of media to the product occurs at the time of vending. These machines also can offer a much greater variety of products than possible with conventional vending machines.

U. S. Pat. No. 4,672,554, issued on Jun. 9, 1987 to Hirokazu Ogaki, describes an early software vending machine. This device used a hard disk drive for storage of software programs to be vended, and a tape cassette as the removable storage media on which programs are dispensed. A quantity of blank tape cassettes is stored within the machine. A rack holds ads for individual programs, and a numeric keypad is provided for user selection of the software to be dispensed. A floppy disk drive (column 5, lines 30–40) is provided for loading programs onto the hard disk, but is apparently not used for duplicating purchased software.

U. S. Pat. No. 4,674,055, issued on Jun. 16, 1987, also to Hirokazu Ogaki, describes a system in which a number of remote software vending machines resembling those of U.S. Pat. No. 4,672,554 are connected to a central host processor. The central host is responsible for collecting accounting information from each remote vending machine, and for updating the hard drives of the remote machines with new software to be vended. Neither Ogaki patent discloses the use of an optical read-only disk for program storage or audible instructions for machine operation, nor does either Ogaki patent disclose the automatic verification of credit cards. Further, Ogaki does not disclose the use of audible messages to instruct a customer in machine operation, or to inform customers of the characteristics of programs available for vending.

U.S. Pat. No. 5,267,171, issued to Takamitsu Suzuki on Nov. 30, 1993, describes a software vending machine which further comprises a reader for a customer identification card. This card contains information regarding past transactions with the customer, including the type of computer owned by that customer and category of software last purchased by the customer. The software vending machine uses this record of past purchases to go directly to a menu of available software suitable for that customer's computer in the last purchased category, and to display first those programs which have been installed on the vending machine after the last purchase by that customer. This machine writes vended software onto a floppy disk instead of to the tape cassette of U.S. Pat. 4,672,554, and incorporates a printer for dispensing instructions for using the vended software.

In recent times, the CD-ROM has become a practical device for storage of large quantities of read-only information. Typical CD-ROM devices in current production store up to 650 megabytes of data as a pattern of indentations on a five inch plastic disc similar to those discs commonly sold bearing audio compositions. Data is read optically. Larger capacity optically read disks are available using technology similar to that used for laser video disks. Some vendors are moving towards a standard for an optically read disc similar in size to a CD-ROM, but having substantially greater capacity than current CD-ROMS; these devices are not yet on the market but may be expected soon.

The floppy disk has virtually entirely supplanted tape cassettes as the medium of choice for delivery of software to consumers. CD-ROM is becoming increasingly popular as a medium for distributing software that would otherwise occupy large numbers of floppy disks. Recently collections of software programs have become available on CD-ROM in encrypted form, where an owner of the CD-ROM may obtain a decryption key for a specific program upon payment of a program-specific fee. Fee payment and distribution of the decryption key is typically done by way of telephone, a credit card number is given to an operator in exchange for the decryption key. Because typographical errors in entering the key may result in failure of the decryption, sellers of software may use keys that are shorter and simpler to enter than required for adequate security.

In recent times, much software has been distributed as shareware. Shareware consists of software which is distributed freely to users by permission of the author. Shareware is distinguished from freeware in that shareware is distributed under the understanding that use of the software beyond an initial trial period requires payment of a licensing fee to the authors of the software.

Many conventional vending machines now use an electrically rotated helix in a tray as a dispensing device. The item to be dispensed is placed between turns of the helix, the first item to be dispensed located approximately one turn of the helix from the end of the helix. The helix is positioned in the tray such that the bottom of the tray is present under the items in the helix to be dispensed, and not present under the end of the helix. When an item is dispensed, the helix is rotated one revolution, during which the item being dispensed is pushed to the end of the helix. As there is no tray under the end of the helix, gravity then causes the item to fall into a receiving bin.

SUMMARY OF THE INVENTION

The present invention comprises a software vending machine that incorporates a processor, a CD-ROM or other high capacity optically read disk and drive for storage of the software to be vended, a dispensing device for floppy disks, a bill acceptor for receiving money, a CRT monitor for displaying a menu of software programs available to be vended, a device for selecting the software program to be vended, and a floppy disk drive for writing the software program onto the floppy disk. Typical embodiments of the present invention further comprise a magnetic hard disk drive for storing system software and interim updates to the software to be vended. Alternative embodiments of the present invention also include a reader for the magnetic stripes encoded on credit cards, and may further include a modem.

The bill acceptor, credit card reader, CD-ROM, hard disk, dispensing device for floppy disks, the device for writing, the device for selecting software to be vended, and the modem are all interfaced to and controlled by the processor.

In operation of the present invention, a customer selects from a menu of menus. The selected menu is a menu of software titles available in some category of interest to the customer. The customer then selects the desired software from this menu. Selection is by means of a trackball, which is used to position a cursor on the monitor screen, and a "click" button. A short paragraph of information may be displayed about each program to assist the customer's decision, as well as the number of floppy disks required for the program and the fee that the machine will collect from the customer before vending the program.

Should the user decide to go ahead with the transaction, that user is prompted to place money sufficient to cover the price of the selected software in the bill acceptor. A floppy disk will then be ejected by the diskette dispenser, and the customer will be prompted to place the dispensed disk in the suitable floppy disk drive. The software purchased will then be copied onto the disk. Software is typically placed on the diskettes in compressed form, together with a decompression utility that will decompress the software into usable form on the customer's hard disk.

In an alternate mode of operation, when the user is prompted to insert money, the user may instead swipe a credit card through the credit card reading device. The software vending machine will, through the modem, automatically dial a credit verification service. When an approval code is received from the credit verification service, the machine will dispense diskettes and write the selected software on the dispensed diskettes.

In an alternate mode of operation, the software vending machine of the present invention may dispense a CD-ROM containing a number of software packages sold as a set.

In yet another mode of operation, the software vending machine of the present invention may dispense a CD-ROM containing a number of software packages in encrypted format. The CD-ROM may or may not also include unencrypted "free" programs. A floppy disk will also be dispensed, and the customer will be prompted to insert the floppy disk in the appropriate size floppy disk drive. One or more decryption keys, or a combination of a decrypting install program and decryption key, will then be copied onto the floppy disk. The customer may then take the diskette and CD-ROM to his own computer, whereupon the decryption key on the floppy disk can be used by a decrypting install program to decrypt only those programs on the CD-ROM for which the customer has paid a required licensing fee.

It was found that a typical rotating helix dispenser would jam and otherwise fail to dispense floppy disks. A rotating helix dispenser having the dimensions, slope, helix construction, and channel hereafter disclosed was able to properly dispense floppy disks.

THE DRAWINGS

The best mode presently contemplated for carrying out the invention is illustrated in the accompanying drawings, in which:

FIG. 1, is a front elevation of the software vending machine of the present invention cut away to show the helical diskette dispenser, the computer case, and the CD-ROM drive, with the computer case further cut away to show some of the boards in the case, and the front plate of the diskette dispenser removed;

FIG. 2, a b lock diagram of a software vending machine of the present invention;

FIG. 3, a fragmentary horizontal section taken on the line 3—3 of FIG. 1, showing in top plan view the helical coil and tray used for dispensing diskettes in the present invention;

FIG. 4, a vertical sectional view of the helical coil and tray used for dispensing diskettes in the present invention taken at the line 4—4 of FIG. 3;

FIG. 5, a fragmentary horizontal section taken on the line 5—5 of FIG. 4 showing in top plan view the microswitch used to detect diskette empty in the diskette dispenser of the present invention; and FIG. 6, a simplified flow chart of the software vending applications program utilized by the machine.

DETAILED DESCRIPTION OF THE ILLUSTRATED EMBODIMENTS

Figure 1:
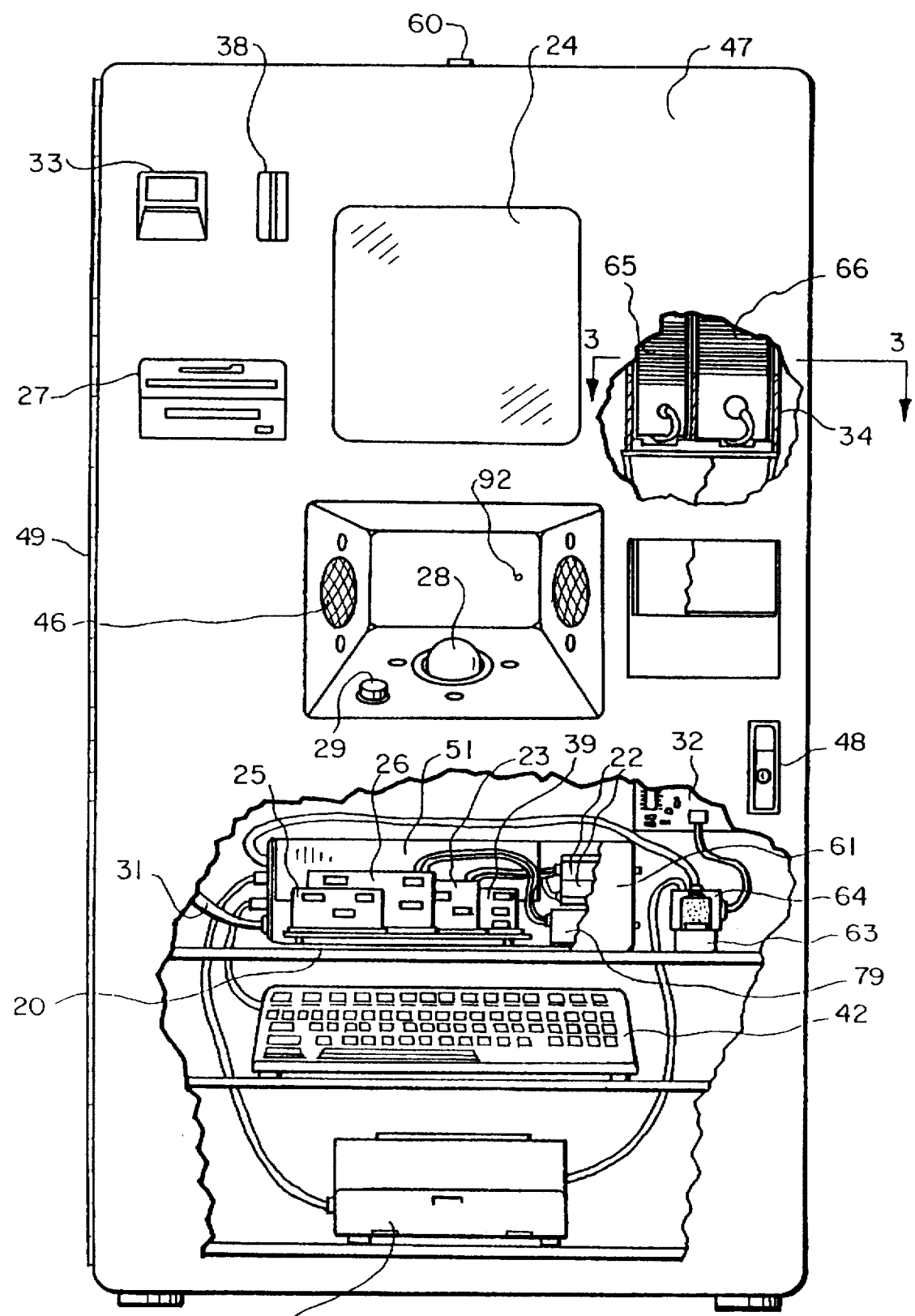
Figure 2:
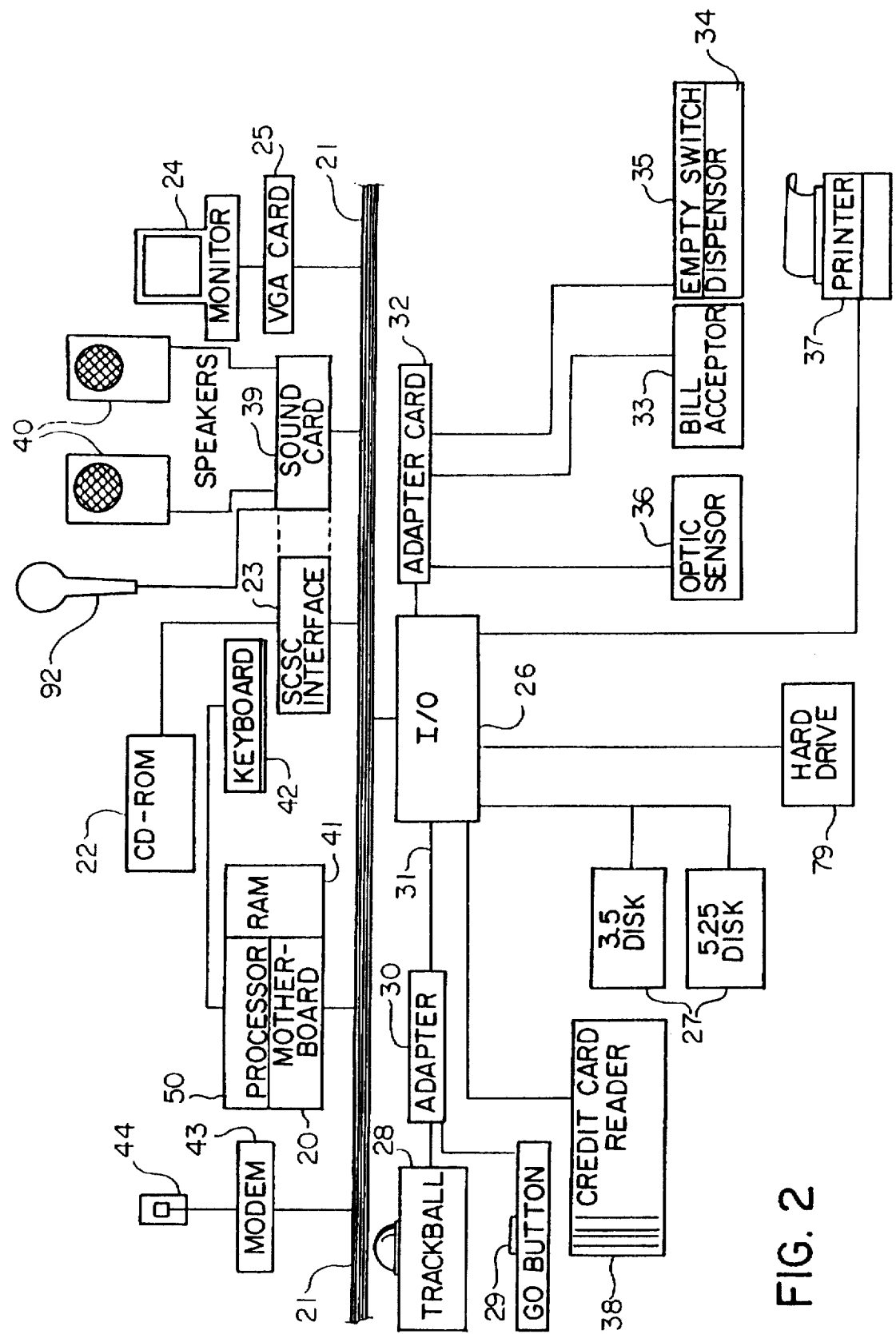
Figure 3:
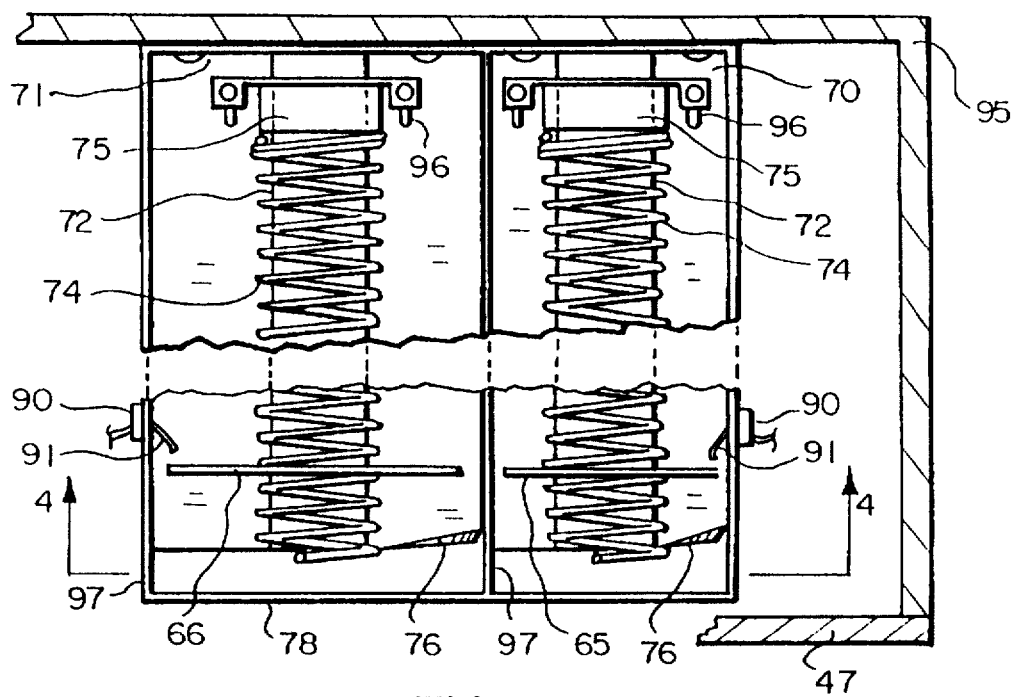
Figure 4:
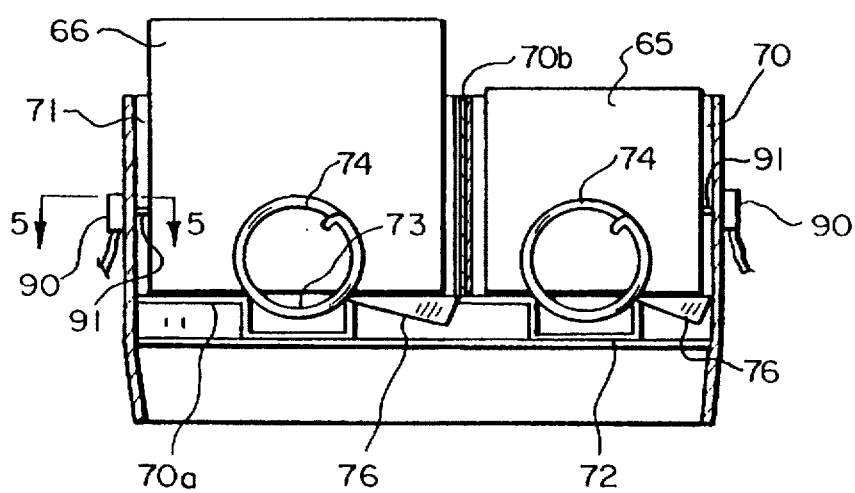
Figure 5:
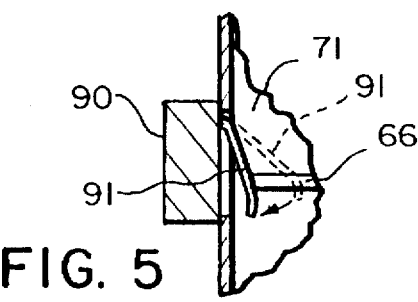

The present invention comprises a software vending machine built around a standard motherboard 20 containing a processor 50 and power supply 51 for an IBM-compatible computer of the 80386 class or higher. This motherboard is equipped with several 16-bit standard ISA bus slots 21. One or more, in the present preferred embodiment two, CD-ROM drives 22 are interfaced to an ISA bus slot of this motherboard through a SCSI interface 23, and a standard color SVGA monitor 24 is interfaced to the ISA bus through a standard SVGA interface card 25.

A standard multi-I/O card 26 is also provided to interface the ISA bus 21 to a 420 megabyte Conner Peripherals IDE interface hard disk drive 79, and to a pair of floppy disk drives 27, one of which is in the presently preferred embodiment a 3½ inch Teac FD235HF 1.44 megabyte (formatted) drive and the other a 5¼ inch Teac FD55GFR 1.2 megabyte (formatted) drive.

Also interfaced to the ISA bus 21 through the multi-I/O card 26 is an optical trackball 28 and selection button 29, which are interfaced to a serial port by means of an adapter card 30 and serial interface cable 31. The trackball and selection button together appear to the system software as if they were a mouse.

A parallel printer port on the multi I/O card 26 is connected to a custom built adapter card 32, that is further interfaced to a JCM 45DV high security bill accept or 33, made by JCM of Las Vegas, Nev., an electromechanical diskette dispenser 34 having a tray-empty detection switch 35, and an optical sensor 36. The adapter card 32 contains a serial to parallel converter that translates the serial output of the bill acceptor 33 into a parallel form that may be read by the parallel printer port on the multi I/O card 26. The adapter card 32 also contains power drivers for the diskette dispenser motors 75 and the amplifiers and filters for the photosensor 36.

Also connected to a second parallel printer port of the multi I/O card is a printer 37. This printer is provided for producing a hard copy of accounting information. A reader 38 for the magnetically encoded stripe present on the back of most credit cards is also provided in an alternate preferred embodiment of the present invention, and is connected to a serial port on the multi I/O card 26.

Also connected to the ISA bus 21 is a "soundblaster 16" compatible sound card 39, which may or may not be colocated with the SCSI interface 23, and which drives a pair of speakers 40. The motherboard 20 is equipped with eight megabytes of Random Access Memory (RAM) 41 and is attached to a standard keyboard 42.

The present invention further comprises a modem card 43 connected to the ISA bus. This modem may be further connected to a telephone line 44 for use in remote access to accounting information and for use in validating credit card information.

The trackball 28, selection button 29, diskette drives 27, an in take slot of the bill acceptor 33, a faceplate of the monitor 24, and a receiving bin for the diskette dispenser 34 are mounted such that they are accessible to the customer of the machine. Some of these components, including the bill acceptor 33, are mounted on and are accessible through a door 47, other components, such as the monitor 24, are mounted within a cabinet 95 such that they line up with a hole in the door when the door 47 is closed. The speakers 40 are mounted behind grilles 46 in such a manner that the customer can hear sound generated by the speakers 40. The door 47 has a lock 48 and is mounted on hinges 49 to the cabinet to form a lockable compartment containing the remaining components of the machine, including the keyboard 42. A system reset switch 60 is mounted at the rear of the top of the cabinet. Within this lockable compartment is a standard computer case 61 wherein the motherboard 20, power supply 51, Multi I/O card 26, CD-ROM drive 22, SCSI interface 23, sound card 39, and VGA card 25 are mounted. Also mounted within the cabinet is a 24-volt D. C. power supply 64 for the diskette dispenser and a surge suppressor 63 for protection of the software vending machine from power line or phone line transients.

An alternate preferred embodiment of the present invention uses a touch screen (not shown) instead of the trackball 28 and the selection button 29 of the first commercial embodiment of the present invention for selecting the software to be vended.

In yet another embodiment of the present invention, a CD-ROM device having an IDE interface is used. This device may attach to the IDE interface on the Multi I/O card 26, and the SCSI interface 23 may be eliminated from the system. This technique, however, permits a smaller total number of CD-ROM drives than possible with a SCSI interface and is therefore not preferred at the present time.

In yet another embodiment of the present invention, the IDE interface hard disk 79 may be replaced by a SCSI interface hard disk, which may be connected to the SCSI interface 23 instead of to the Multi I/O card 26. In this embodiment, no IDE interface is required on the Multi I/O card, although the floppy drive interface, serial port, and parallel port a re still required.

The motherboard and 20 and processor 50, power supply 51, CD-ROM drive 22, SCSI adapter 23, monitor 24, SVGA card 25, multi I/O card 26, hard disk 79, floppy drives 27, sound card 39, speakers 40, RAM 41, printer 37 and keyboard 41 are all standard parts readily available in computer stores.

The motherboard 20 contains a copy of a BIOS system that has been configured such that the processor 50 may only boot from the hard disk drive 79. The hard disk drive 79 contains a copy of the Microsoft MS-DOS operating system, version 6.0 or higher, with multimedia extensions MSCDEX version 2.22 or higher, and a copy of Microsoft Windows 3.1 or better. The system is configured by means of an "autoexec.bat" and a "config.sys" file to automatically load the MS-DOS system, the MSCDEX extensions, and Microsoft Windows. Microsoft Windows is further configured to automatically load a software vending applications program and a screensaver program whenever power is applied to the system or the reset button 60 is hit.

The screensaver program running on the processor 50 causes the SVGA card 25 to display an enticement sequence on the monitor 24 that is intended to draw attention of passers by. This enticement sequence may include an audio component should the owner of the machine enable this feature. Should a nearby passer by be enticed close enough to the machine to cause a decrease in the light level at the machine, as measured by the photosensor 36, an additional audio enticement sequence may be generated, and, with luck, the passer by may become a customer.

When a customer turns the trackball, the trackball 28 will send a series of signals to the Multi I/O card 26. These signals will be received through the Multi I/O card 26 and the ISA Bus 21 to the processor 50 on the motherboard 20. The software vending program running on the processor 50 will then preempt the screensaver enticement sequence and take over control of the monitor. The processor 50 will track these trackball signals, displaying by means of the SVGA card 25 a top-level menu and a cursor corresponding to trackball signals on the monitor 24. When the cursor is positioned over a "button" region on the monitor 24, the customer may press, or "click" the selection button 29. The processor 50 may then display a sub-menu of available software categories. When the cursor is positioned over a category on this sub-menu, the customer may press the selection button 29 again, whereupon the processor 50 may cause a list of available software selections to be displayed on the monitor 24.

Since the list of available software selections in a given category is often too long to be displayed on one screen of the monitor 24, up and a down "button" areas on the screen are displayed along with a subset of the available selections. The customer may position the cursor over these up and down buttons and press the button 29, whereupon the processor 50 may scroll the list of software titles to display additional titles to the customer. When the customer selects a title by pressing the selection button with the cursor positioned over the desired software entry in the sub-menu, the processor 50 may cause the SVGA card to display a paragraph of text on the monitor 24 describing the indicated software, including the price of the indicated software, and the processor 50 may cause the sound card 39 and speakers 40 to generate an audible message describing the software and the actions the customer may take.

The customer may then choose to select a different program, whereupon the description of that program will be displayed. The customer may also choose to continue with a purchase of the indicated software. Should the customer decide to continue with a purchase of the software, the customer will use the trackball 28 to position the cursor over a "buy" button on the monitor 24, and press the button 29. At this point, the customer will be advised audibly by means of the sound card 39 and speakers 40, and visually by means of text displayed on the monitor 24, to insert currency in the bill validator 33. When sufficient cash has been received by the machine, the processor 50 will cause the diskette dispenser 34 to eject the appropriate number of preformatted diskettes, and the sound card 39 and monitor 24 to advise the customer to place one of these diskettes in the appropriate floppy disk drive 27. Once the floppy disk is in the drive, the processor 50 will copy the selected program from the CD-ROM 22 into the RAM 41, and from the RAM 41 onto the floppy disk.

In the preferred embodiment of the present invention, there is more than one CD-ROM drive 22 attached to the SCSI interface 23. The presently preferred embodiment of the invention incorporates two CD-ROM drives 22. This permits storage of a greater number of, or the same number of larger, software programs to be vended. The SCSI interface 23 can support up to seven such CD-ROM drives 22.

In an alternate embodiment of the present invention, the machine is equipped with a device 38 for reading the magnetic stripe of credit cards in addition to the bill validator 33. When a customer has selected a program, that customer may position the cursor over either a "buy cash" or a "buy credit" button region on the monitor and pressing the button. If the customer presses the button while the cursor is positioned on the "buy credit" button region on the monitor, the processor 50 advise the customer audibly by means of the sound card 39 and speakers 40, and visually by means of text displayed on the monitor 24, to swipe his credit card through the device 38 for reading magnetic stripes. The magnetic stripe reader 38 will read the customer's credit account information from the card, which will be communicated to the processor 50.

The processor 50 will then, my means of modem 43, telephone a credit verification service (not shown) and request validation of the credit account information and credit approval for the selling price of the selected software. If the credit account information is validated successfully and the credit transaction approved for the price of the selected software, the processor 50 will cause the diskette dispenser 34 to eject the appropriate number of diskettes 65, and the sound card 39 and the monitor 24 to advise the customer to place one of these diskettes in the appropriate floppy disk drive 27. Once the floppy disk is in the drive, the processor 50 will copy the selected program from the CD-ROM 22 into the RAM 41, and from the RAM 41 onto the floppy disk. The program being vended is copied to the diskette in compressed form, together with a decompression utility and an installation program. While copying the program from the CD-ROM 22 to the floppy disk 27, the processor 50 will check a table of updates on the hard disk 79. Should one or more of the program files on the CD-ROM 22 have a corresponding updated file on the hard disk 79, the updated file will be written to the floppy disk 27 instead of the obsolete version located on the CD-ROM 22.

Upon completion of writing the floppy disk, or a series of disks for programs that are too large to fit on one floppy disk, the processor 50 will write accounting information relevant to the completed transaction on the hard disk drive 79. This information may also be printed by printer 37 to provide a hard copy of the record. This accounting information may be used to determine what, if any, royalties are due to the owners of the copyrights in the dispensed software.

In an alternate preferred embodiment of the present invention, two floppy disk drives 27 are provided in the same diskette size. Such a machine may provide two 3½ inch diskette drives for transferring vended programs to the popular 3½ inch format diskettes. When a program requiring two or more diskettes is purchased, the customer may be requested by the machine to place one diskette in each drive. The machine may then copy the vended software to multiple diskettes by alternating between copying to the first drive, and copying to the second drive of the drive pair. In this manner, the machine may copy the purchased software onto diskettes in less total time than would be the case if only a single drive were provided because the customer can change the floppy disk in one drive while the other drive is copying part of the program.

Many software programs available today require a large quantity of diskettes, programs requiring several tens of megabytes are no longer uncommon. Several of these programs may, however, still fit on one CD-ROM. Yet another embodiment of the present invention may vend such large software programs by dispensing both a CD-ROM 66 and a floppy disk 65. The dispensed CD-ROM 66 contains a number of large programs in encrypted form, and may also contain a number of additional shareware programs in unencrypted form. Programs may be compressed prior to being encrypted. Encryption may utilize the NES encryption standard or any other encryption technology. After dispensing the floppy disk 65 and the CD-ROM 66, the machine will prompt the customer to place the floppy disk 65 in the appropriate diskette drive 27, and the decryption key required for proper decryption of the vended software will then be written to the floppy disk.

The machine may be accessed from a central location to allow the accounting information to be read, to enter minor software updates onto the hard disk, and for diagnostic purposes. This may be done by setting the modem 43 to automatically answer a telephone line 44. A centrally located host machine may dial the number to which the software vending machine is connected. When the modem 43 answers, the software vending machine may request a password. Two passwords are provided, one for factory use, and one for use by the owner of the machine. Once the password is entered, the owner or factory may conduct diagnostics, software updates, or access accounting information via the phone line without being physically present at the machine location.

For proper dispensing of 3.5 inch diskettes, it was found necessary to use a steel dispensing tray 70 four inches wide, and for dispensing 5.25 inch diskettes or CD-ROMS a tray 71 six inches wide. The bottom of each tray is formed with a recessed channel 72 that is 1.75 inches wide and ⅝ inch deep running the entire 23 inch length of the tray. The channel allows the top of the bottom portion 73 of each turn of the helix 74 to sit below the bottom of the diskettes 65. The diskettes rest on the tray over the channel and between tray sides 70b which keep the diskettes positioned in the tray. The channel 72 also helps to keep the helix centered in the tray. It is preferred that the rear of each tray be elevated 4 inches above the elevation of the front of each tray, this sloping of the tray has been found helpful in keeping the helix stretched to its normal working length, and avoiding compression of the helix due to friction of the diskettes as they slide along the the tray bottom during operation of the helix. This slope helps avoid jamming of diskettes in the dispenser.

The helix 74 is generally formed of 0.048 inch diameter spring steel with a turn pitch of ⁵⁄₁₆ inch. The helix is 2.5 inches in diameter. The length of the helix can vary depending on the desired number of diskettes to be stored in the dispenser, but for the described diameter of spring steel, the maximum length of the helix for reliable operation is about 23 inches. A 23 inch helix can hold about 33 diskettes.

The dispensing motors 75 for each helix, which are standard motors common in the rotating helix vending machine industry, for each helix are mounted by bolting them to slots 96 formed in the rear portion of each tray. These slots 96 allow the motor positions to be adjusted such that the front end of the helix extends past the front end of the tray far enough that diskettes will drop freely when dispensed, but that the next diskette in line will remain supported by the tray.

A triangular portion 76 of the right side of each tray, extending from the right side of the channel to the right side of the tray, and to a point ⅛ of an inch back from the front of the tray at the right side of the tray, of the bottom of each tray, is bent downwards at 45 degrees. This bend in the bottom of each tray forms a ramp that has been found to help prevent diskettes from hanging up on the end of the tray as they are dispensed. Each side wall of the tray is formed with a tab extending forwards past the end of the tray bottom by one inch. Side walls of the trays are approximately one and three fourths inch high. This tab helps keep the dispensed diskette aligned in the tray until the diskette falls past the end of the tray bottom, thereby preventing the diskettes from hanging up and jamming. A front end plate 78 of the dispenser is supported by these tabs.

The diskette dispenser is further equipped with a sensing microswitch 90, which has a feeler 91 extending into the space within the dispenser tray 70 that is normally occupied by diskettes 65. This switch is set to determine when there are less than four remaining diskettes in the tray. This switch is interfaced to the ISA bus 21, so that an "out of diskettes" message may be displayed to potential customers. The processor may also be configured to send a message to a central location by means of the modem 43 and the telephone line 44 to notify the owner when the machine has run out of diskettes. When the machine is out of diskettes, an alternate embodiment of the present invention may vend software onto customer supplied diskettes.

Another alternate embodiment of the present invention incorporates a microphone 92 connected to the sound card 39. Should a customer desire to leave a comment about the machine, or the selection of software vended by the machine, the customer may click on a "leave message" button area of the screen 24 and speak into the microphone 92. The sound card 39 will then digitize the customer's voice and write the digitized sound to the hard disk 79. Another alternate embodiment of the present invention utilizes a CD-ROM changer instead of a plurality of CD-ROM drives 22. A CD-ROM changer allows a single CD-ROM drive 22 to be used to automatically play one of a number of CD-ROMS. This alternate embodiment will allow a greater variety of software to be stored in the machine than possible with a single CD-ROM drive.

The software vending machine of the present invention may also operate as a vending machine for sales of individual diskettes without recording software on the diskettes. The price of such blank, formatted, diskettes may be set lower than the price for diskettes containing programs.

Figure 6:
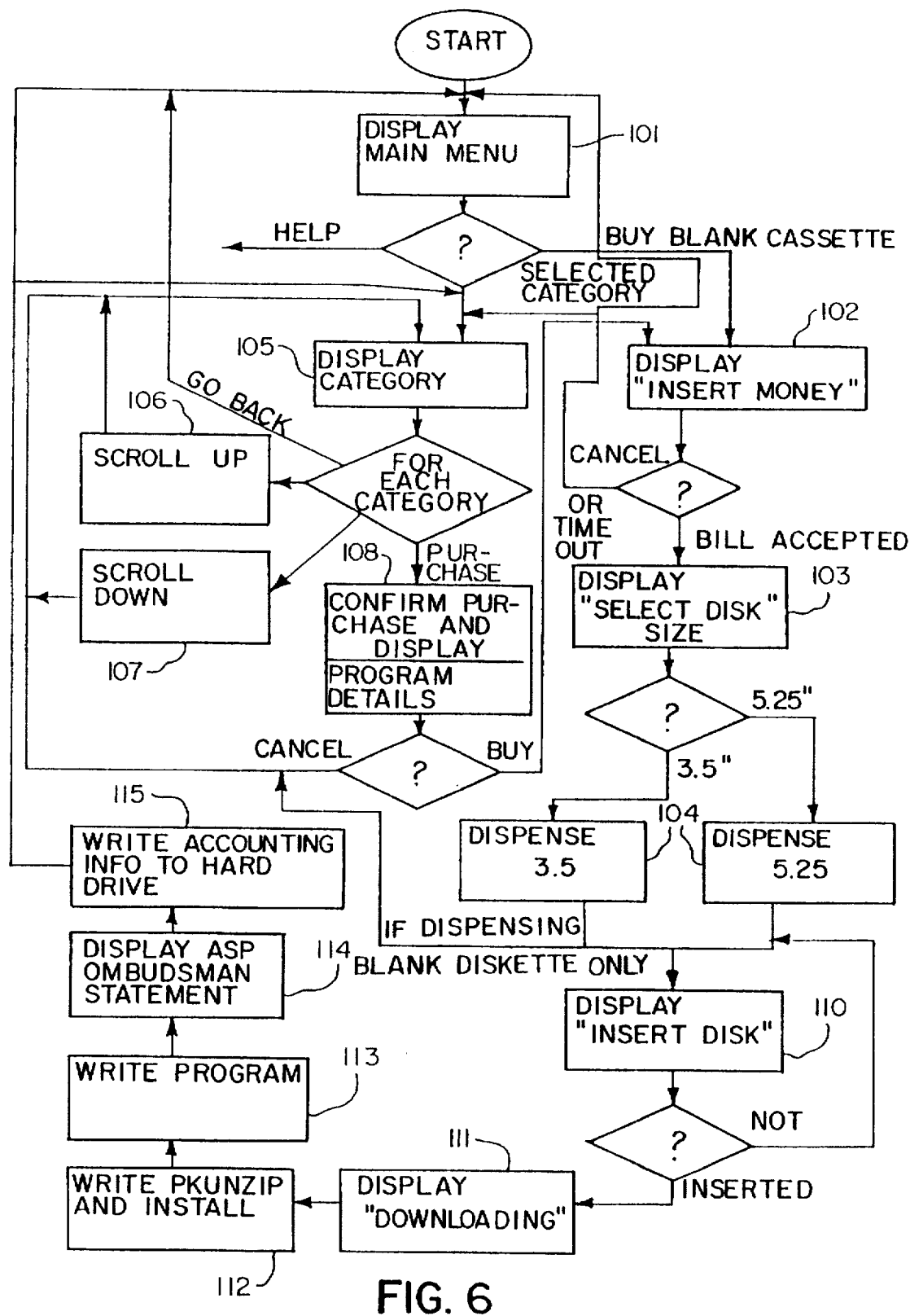

Typical operation of the machine may be understood through the simplified flowchart of FIG. 6. At initialization, the machine displays 101 a main menu that lists a number of software categories, together with an option to buy only a blank diskette and an option to provide user help. If the trackball is not moved within a time limit, the screensaver begins the enticement sequence. When the trackball is moved, the enticement sequence is stopped and the main menu 101 is displayed again.

If the customer clicks the buy blank diskette option, the program displays an insert money screen 102 requesting the price of the diskette. If no cash is received before a timer expires, the machine reverts to the main menu 101, if cash is received the program displays a select disk size screen 103. The user may then select a diskette size, and the appropriate diskette will be dispensed 104. If the machine was dispensing a blank diskette, the machine will then revert to displaying the main menu.

If the customer clicks on a category of programs, a list of programs within that category will be displayed 105. The customer may choose to return to the main menu 101, may scroll the category menu up 106 or down 107, or may click on a program 108. If the user clicks on a program, a description of that program will be displayed, which may or may not include audio and video sequences. The customer may choose to return to the category menu, to cancel the transaction returning to the main menu, or may click on a "buy program" option. If the customer clicks on the buy program option, the program will cause the insert money screen 102 to be displayed with the price of the program to be vended.

If the customer opted to purchase a program, after the diskettes are dispensed 104 the customer will be advised to insert a diskette in the appropriate drive 111. When the diskette is inserted, the machine will display a "downloading" message, and copy a decompression utility (PKUNZIP) and an installation utility to the diskette 112. The compressed program to be vended is then copied to the diskette 113, a message thanking the customer and advising the customer of available grievance procedures is displayed 114, and the accounting information is updated on the hard drive 115.

Nothing in this application is intended to limit the scope of the present invention to the specific embodiment of the present invention that is disclosed. In particular, it may be expected that the functions of the various cards in the system may be partitioned differently; for example the SCSI interface 23 function may be combined with the sound card 39 function on one card, and the Multi I/O card 26 may be replaced by separate floppy disk interface, serial, and parallel port cards if sufficient IDE slots are provided on the motherboard 20. Also, some motherboards 20 are manufactured with serial, parallel, IDE and floppy interfaces on the motherboard, if these motherboards are used some of those functions need not be provided on the Multi I/O card. Further, the adapter card 32 may be directly interfaced to the ISA bus 21 instead of by means of the parallel port on the Multi I/O card.

It is understood that existing CD-ROM technology will be superseded in time with further generations of optically read disks, and the term CD-ROM as used herein is intended to refer to these future optically read disks. It is also possible to implement the invention using a processor of a different family, such as an Apple macintosh computer based on the Motorola 680X0 series of processors, or one based upon the IBM power-PC processors.

While the software that is dispensed is presently compressed using PKZIP 2.04G, a shareware software data compression and decompression package available from PKWARE, nothing in this application is intended to exclude alternative compression technologies. Further, nothing in this application is intended to limit the scope of the present invention to embodiments incorporating Microsoft MS-DOS version 6.0 combined with Microsoft Windows 3.1. In particular, the current version of the software dispensing application program has run successfully on Windows for Workgroups, and can be expected to run with little if any modification under the OS-2 operating system from IBM. The forthcoming Windows 95, and the existing Windows NT, systems may also be well suited to implementing the present invention. Similarly, the EISA, IBM Microchannel, PCI, and VL-Bus systems may replace the ISA bus for communications among some of the components of the machine.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

We claim:

1. A self-contained software program vending machine comprising:

a cabinet;

a processor within the cabinet;

a bill acceptor in the cabinet and accessible to a user for receiving paper money and for notifying said processor when paper money has been received;

an optically read disk within the cabinet for storing a plurality of programs;

means in the cabinet under control of said processor for dispensing a blank diskette to the user after said processor has received notification of receipt of paper money;

means for writing comprising a diskette drive in the cabinet and accessible to a user under control of said processor for writing said blank diskette with a program;

a monitor in the cabinet for displaying a menu of program choices corresponding to programs stored on the optically read disk, said monitor equipped with a touch screen accessible to a user to identify to said processor a specific program to be written to said blank diskette from said optically read disk after said processor has received notification that paper money has been received.

2. The software vending machine of claim 1 wherein said means for dispensing a blank diskette further comprises means for dispensing a three and one half inch diskette and for dispensing a five and one fourth inch diskette; and wherein said means for writing said blank diskette further comprises a three and one half inch diskette drive and a five and one quarter inch diskette drive.

3. The software vending machine of claim 1 wherein said means for dispensing a blank diskette further comprises a helix that may be rotated to expel a diskette.

4. The software vending machine of claim 3 further comprising means for dispensing a CD-ROM under control of said processor.

5. A software program vending machine comprising:

a processor;

a bill acceptor for receiving paper money and for notifying said processor when paper money has been received;

an optically readable disk for storing a plurality of programs;

means under control of said processor for dispensing a blank diskette after said processor has received notification that money has been received;

a diskette drive under control of said processor for writing said blank diskette with a program;

a monitor under control of said processor for displaying a menu of program choices;

a trackball for manipulating a cursor displayed on said monitor such that said cursor indicates a particular program choice;

a button for identifying a specific program to be vended to said processor;

a sound card and loudspeaker device for instructing users in machine operation;

a sensor to sense the presence of a potential user near the machine; and means operable by said sensor to begin an audio enticement sequence when a potential user is sensed near the machine.

6. The software vending machine of claim 5 wherein said means for dispensing a blank further comprises a helix that may be rotated to expel a diskette.

7. The software vending machine of claim 6 further comprising means for dispensing a CD-ROM under control of said processor.

8. The software vending machine of claim 7 wherein dispensing of a CD-ROM is accompanied by dispensing of a decryption key for a specific program on floppy disk.

9. The software vending machine of claim 5 wherein said monitor may also display a video demonstration of a selected program under control of said processor.

10. The software vending machine of claim 5, wherein the sensor is a photosensor.

11. The software vending machine of claim 5 further comprising a fixed disk drive for storing software for operating said software vending machine, for storing sales statistics, and for storing updated programs to be vended.

12. The software vending machine of claim 11 wherein the vended software may be vended upon a plurality of floppy disks.

13. The software vending machine of claim 5 further comprising:

a reader for magnetically encoded credit cards; and a modem under control of said processor for validating credit cards and obtaining credit authorizations, whereupon the processor may act as if money has been received.

14. The software vending machine of claim 13 further comprising means for dispensing a CD-ROM under control of said processor.

15. The software vending machine of claim 14 wherein said CD-ROM contains software in encrypted form, and wherein dispensing of a CD-ROM is accompanied by dispensing of a decryption key on a diskette for use in decrypting a specific program on the CD-ROM.

16. A self-contained software program vending machine comprising:

a cabinet;

a processor within the cabinet;

an optically read disk within the cabinet for storing a plurality of software programs;

means in the cabinet under control of the processor and visible to a user for indicating software programs available for vending;

means in the cabinet and accessible and operable by a user through which a user identifies a desired software program to be vended;

means in the cabinet and accessible to a user for receiving money from a user and for notifying said processor when money has been received;

a hard disk drive in the cabinet for storing operating software, accounting information, and updates to the software programs to be vended;

means in the cabinet under control of said processor for dispensing a blank diskette to the user after said processor has received notification of the receipt of money; and means under control of said processor and accessible to the user for writing the identified software program including any updates thereto, on said blank diskette.

17. The software vending machine of claim 16 wherein said means for dispensing a blank diskette further comprises means for dispensing a three and one half inch diskette and for dispensing a five and one fourth inch diskette; and wherein said means for writing said blank diskette further comprises a three and one half inch diskette drive and a five and one quarter inch diskette drive.

18. The software vending machine of claim 16 further comprising means under control of said processor for dispensing a CD-ROM.

19. The software vending machine of claim 18 further comprising a monitor for indicating a menu of program selections available for vending, and wherein said menu further comprises a top level menu of categories and a plurality of sub menus of programs in a given category.

20. The software vending machine of claim 19 further comprising a sound card and loudspeaker device for instructing users in machine operation and for giving information about the software.

21. The software vending machine of claim 19 wherein said monitor may also display a demonstration of a selected program under control of said processor.

22. The software vending machine of claim 18 wherein the CD-ROM dispensed contains a plurality of software in encrypted form, and wherein the means under control of said processor for writing said blank diskette writes onto said blank diskette a decryption key for those encrypted programs on the dispensed CD-ROM for which money has been received such that a customer may use said decryption key to decrypt the programs for which money has been received.

23. A software program vending machine comprising:

a processor;

means for receiving money and for notifying said processor when money has been received;

an optically read disk for storing a plurality of programs;

a hard disk drive for storing operating software, accounting information, and decryption keys to the software to be vended;

means under control of said processor for dispensing a blank diskette;

means under control of said processor for dispensing a CD-ROM containing thereon a plurality of software in encrypted form, different software having different encryption keys;

means for identifying to said processor a specific program to be vended; and means under control of said processor for writing to said blank diskette a decryption key to the identified program after said processor has received notification of the receipt of money.

* * * * *